3,320,235
STABLE AND ACTIVE FRADIOMYCIN SALTS AND PREPARATION THEREOF

Hiroaki Nomura, Nishinomiya, and Keiichi Sugimoto, Suita, Japan, assignors to Takeda Chemical Industries, Ltd., Osaka, Japan
No Drawing. Filed Sept. 9, 1964, Ser. No. 395,330
Claims priority, application Japan, Sept. 13, 1963, 38/48,882
4 Claims. (Cl. 260—210)

This invention relates to novel and useful fradiomycin salts and preparation thereof and, more particularly, to stable and active fradiomycin salts which consist of fradiomycin and calcium cations and a hydroxy polycarboxylic acid anion, and a method for preparing them as well as compositions containing these salts.

Fradiomycin is an antibiotic isolated from the culture broth of *Streptomyces fradiae* by Waksman et al. in 1949, and has been used in the forms of its hydrochloride or sulfate as a pharmaceutical preparation, for example, as medicines for external applications (e.g. against impetigo, skin ulcer, spcosis, etc), ophthalmic medicines, cytogenic enteropathy medicines, or general antimicrophytes. Fradiomycin sulfate has been recorded in the Japanese Pharmacopeia VII (1961) and is a synonym of "Neomycin sulfate" recorded in the U.S. Pharmacopeia XVII (1960).

These hitherto-known fradiomycin salts are, however, so hygroscopic and unstable that they are easily moistened and deliquesce even under low humidity, which prevent them from being triturated by usual pulverizers such as atomizers, high-speed mills, etc. And they are required to be processed into pharmaceutical preparations in a laboratory having special low humidity and, for their storage special preservative methods and packagings are necessary. Furthermore, the commercial value of known fradiomycin salts and their preparations is apt to be lessened by coloration caused by moisture, their unpleasant odor and bitter taste.

It is an object of the present invention to provide novel and useful fradiomycin salts which consist of fradiomycin and calcium cations and a hydroxy polycarboxylic acid anion having from 4 to 6 carbon atoms, the salts being nonhygroscopic, stable, noncolored, tasteless and odorless. Another object is to provide a method of preparing such improved fradiomycin salts. A further object is to provide new pharmaceutical compositions containing a fradiomycin salt thus improved. Other objects will be apparent from the detailed description of this invention hereinafter provided.

The above-mentioned novel and useful fradiomycin salt is the salt consisting of M mole of fradiomycin cation, N mole of a hydroxy polycarboxylic acid anion having from 4 to 6 carbon atoms and L mole of calcium ion, M, N and L being in the relation of the equation $$nN - 2L = kM$$

where $n$ stands for the basicity of polycarboxylic acid and $k$ is an integer from 1 to 6.

As a result of study the present inventors found that the improved fradiomycin salts can be conveniently prepared by combining fradiomycin and a calcium ion donor with a hydroxy polycarboxylic acid having from 4 to 6 carbon atoms at a molar ratio specified hereinafter.

Fradiomycin is a base having six amino radicals. Therefore, the molar ratio of fradiomycin, the hydroxy polycarboxylic acid and the calcium ion donor varies with kinds of salts to be contained in the preparations. For example, the molar ratio of the three starting materials is variable so long as the following equation is satisfied $$nN - 2L = M$$

wherein $k$ is an integer from 1 to 6 of neutralized amino radicals of fradiomycin, $n$ basicity of hydroxy carboxylic acid, M is molar number of fradiomycin, N is molar number of hydroxy polycarboxylic acid, and L is molar number of calcium ion donor.

Fradiomycin calcium hydroxy polycarboxylic acid salts prepared in accordance with this invention contain relatively less moisture as $k$ in the above formula increases. Thus, the salts having in the above formula the value of 6 as $k$ have the most desirable characteristics. And, it is now discovered that even when the above mentioned salts have in the above formula the value of 1 as $k$, they still keep free-flowing quality after standing in moist conditions of 75% of relative humidity at 30° C. for 10 days, for example, as shown in the following table. On the contrary, fradiomycin sulfate perfectly deliquesces under those conditions.

| Molar ratio | | Moisture absorption equilibrium (percent) (in relative humidity 75%, at 30° C., for 10 days) | Appearance |
|---|---|---|---|
| Fradiomycin | Calcium citrate (N/L=2) | | |
| 4 | 1 (k=1) | 23.4 | Free-flowing powder. |
| 4 | 2 (k=2) | 21.1 | Do. |
| 4 | 3 (k=3) | 19.4 | Do. |
| 4 | 4 (k=4) | 18.9 | Do. |
| 4 | 5 (k=5) | 17.4 | Do. |
| 4 | 6 (k=6) | 16.4 | Do. |

Three starting materials: Fradiomycin such as fradiomycin free base or its hydrochloride, hydroxy polycarboxylic acid such as malic acid, citric acid or alkali metal salt thereof (e.g. sodium salt or potassium salt), and calcium ion donor such as calcium hydroxide or calciun chloride, are allowed to react with one another at one time or step-wise in any order in an aqueous solution or by using resins.

The reaction of this invention is carried out by allowing hydroxy polycarboxylic acid or its alkali metal salt to react with a calcium ion donor in water and the reaction mixture thus obtained is further allowed to react with fradiomycin.

The pH of the reaction solution is preferably adjusted to around neutral, avoiding strong acid or strong base conditions, and, when the objective compound is desired to be in a pure state, it is preferable that any salts except objective compounds and their elements are not present. The reaction is carried out at room temperature or, if desired, under heating or cooling. The reaction proceeds smoothly in water, if desired, in a mixture of water and organic solvents (methanol, ethanol, actone, etc.), and by the use of resins. In these methods, the ratio of the three starting materials is not strictly fixed but has some allowance if the ratio of N/L is between 1 and 2. That is, when the ratio of N/L is larger than 2, the objective compound is undesirably moistened.

In order to separate the objective compounds from the reaction mixture per se, known means may be used, for example, concentration of the reaction solution containing the objective compounds, addition of organic solvents (e.g. methanol, ethanol, acetone, etc.) to the reaction solution directly or after its concentration, spray drying methods, etc. The objective compounds are obtained quantitatively and are quite stable. The novel fradiomycin salts prepared as described above are of low hygroscopicity, and their moisture absorption velocity is very slow. For example, the moisture absorption equilibrium of fradiomycin calcium citrate represented by the formula

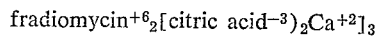

is 11.5% even after the salt is allowed to stand in the condition of relative humidity 75% at 30° C. for 200 hours, and fradiomycin calcium malate represented by the formula fradiomycin$^{+6}$[(malic acid$^{-2}$)$_2$Ca$^{+2}$]$_3$ is 16% in the same condition as mentioned above. Further details of the moisture absorption equilibrium (%) and appearance of the above mentioned fradiomycin calcium citrate are shown in the following table in comparison with known fradiomycin sulfate.

| Name of salt | Time (day) | Relative humidity (Percent) at 30° C. | | | | | | | | | |
|---|---|---|---|---|---|---|---|---|---|---|---|
| | | 22 | | 40 | | 56 | | 75 | | 92 | |
| | | M.A.E. (Percent) | A. | M.A.E. (Percent) | A. | M.A.E. (Percent) | A. | M.A.E. (Percent) | A. | M.A.E. (Percent) | A. |
| Fradiomycin calcium citrate. | 1 | 8.62 | U. | 8.47 | U. | 10.92 | U. | 13.30 | L.H. | 17.15 | H.C.C. |
| | 3 | 8.11 | U. | 8.36 | U. | 10.92 | U. | 14.21 | L.H. | 21.70 | H.C.C. |
| | 5 | 8.20 | U. | 8.36 | U. | 10.92 | U. | 14.33 | L.H. | 24.10 | D. |
| | 7 | 8.18 | U. | 8.34 | U. | 10.92 | U. | 14.42 | L.H. | 25.40 | D. |
| | 11 | 7.92 | U. | 8.25 | U. | 11.05 | U. | 14.57 | L.H. | 26.70 | D. |
| | 14 | 7.77 | U. | 8.06 | U. | 10.83 | U. | 14.30 | L.H. | 24.90 | D. |
| Fradiomycin sulfate | 1 | 6.87 | L.H. | 9.61 | L.H. | 11.55 | L.H. | 16.63 | D. | 17.70 | D. |
| | 3 | 7.44 | H.C.C. | 10.02 | H.C.C. | 12.12 | H.C.C. | 23.01 | D. | 25.40 | D. |
| | 5 | 7.54 | H.C.C. | 10.02 | H.C.C. | 12.11 | H.C.C. | 23.68 | D. | 26.32 | D. |
| | 7 | 7.52 | H.C.C. | 9.94 | H.C.C. | 11.86 | H.C.C. | 24.33 | D. | 27.81 | D. |
| | 11 | 7.52 | H.C.C. | 10.01 | H.C.C. | 11.97 | H.C.C. | 24.70 | D. | 29.45 | D. |
| | 14 | 7.57 | H.C.C. | 10.01 | H.C.C. | 11.90 | H.C.C. | 24.85 | D. | 30.46 | D. |

M.A.E.=Moisture absorption equilibrium; A.=appearance; U.=unchanging; L.H.=a little hygroscopic; H.=hygroscopic; D.=deliquescence with change of color; C.C.=change of color.

It is now discovered that the objective compounds are stable, tasteless, and odorless, and are not colored on standing.

Owing to these properties, the novel fradiomycin salts, the objective compounds of this invention, can be used individually or with pharmaceutically acceptable carrier as medicines for an external or internal application more profitably than known fradiomycin salts. Advantages claimed for this pharmaceutical composition containing the novel fradiomycin salt are as follows:
1. In general—
    (1) The work involved in the manufacture is easy because the novel, fradiomycin salts are of low hygroscopicity and their moisture absorption velocity is very slow.
    (2) Workroom having special low humidity is unnecessary.
    (3) Easily triturated or pulverized.
    (4) Preservation and packaging of the preparation are easily effected.
2. In the case of compressed tablets—
    (1) They have good appearance because no discoloration is caused by moisture absorption.
    (2) Tasteless and odorless.
3. In the case of sugar coated tablets—
    (1) There is but little increase in moisture in tablets in the process of sugar coating because of low hygroscopicity.
    (2) Stable.
4. In the case of film coated tablets—
    They have good appearance because the tablets are not spotted by moisture absorption.
5. In the case of powders—
    (1) Prescriptions are easily made up with no need of being caked, because of low hygroscopicity and good fluidity.
    (2) Tasteless and odorless.
6. In the case of granules—
    (1) They have good appearance because granules are not spotted by moisture absorption.
    (2) Tasteless and odorless.
7. Syrups, ointment, powers for external use, etc., can be profitably manufactured.

*Example 1*

3.7 weight parts of calcium hydroxide are added to a solution of 21 weight parts of citric acid (C$_6$H$_8$O$_7$·H$_2$O) in 500 volume parts of water, and the mixture is stirred at 40° C. for 20 minutes. To this solution is gradually added a solution of 20.5 weight parts of fradiomycin free base in 205 volume parts of water. The resultant solution is allowed to react at 40 °C. for 20 minutes. Thus obtained reaction solution is concentrated to 130 weight parts at a temperature from about 40 to about 50° C. under reduced pressure. To 1000 volume parts of methanol is added the concentrate to give white crystalline fradiomycin calcium citrate. The yield is 40 weight parts (96%).

*Analysis.*—Calculated for fradiomycin$^{+6}$$_2$ [(citric acid$^{-3}$)$_2$Ca$^{+2}$]: citric acid 46.2, Ca 4.9. Found: citric acid 45.6, Ca. 4.8. Specific rotation [α]$^{25}$$_D$=+42.5. Potency: 470 mcg./mg. pH value of 2% water solution, 5.65. Odor: odorless (fradiomycin sulfate has bad odor). Taste: tasteless (fradiomycin sulfate has very bitter taste).

*Example 2*

51 weight parts of citric acid (C$_6$H$_8$O$_7$·H$_2$O) are added to a solution of 50 weight parts of fradiomycin in 1200 volume parts of water, the resultant solution is heated at 40° C. for 20 minutes with stirring, then to the solution is further added gradually 9 weight parts of calcium hydroxide, and the mixture is stirred at 40° C. for 30 minutes. After calcium hydroxide is clearly dissolved, the reaction solution is concentrated to 320 weight parts at 40–50° C. under reduced pressure. White crystalline fradiomycin calcium citrate showing the same properties as described in Example 1, is obtained by pouring the concentrate into 2500 volume parts of methanol. The yield is 100.0 weight parts (98%).

*Example 3*

7.5 weight parts of calcium hydroxide are clearly dissolved in a solution of 27 weight parts of 1-malic acid in 500 volume parts of water. To the resultant solution are added 10 weight parts of fradiomycin free base, and the mixture is allowed to react at 60° C. for 30 minutes. The reaction solution is condensed to 150 weight parts at 50–60° C. under reduced pressure. To 1000 volume parts of methanol is added the concentrate to give white powdery crystalline fradiomycin calcium malate. The yield is 42.5 weight parts (95.5%).

*Analysis.* — Calculated for fradiomycin$^{+6}$ [(malic acid$^{-2}$)$_2$Ca$^{+2}$]$_3$. Specific rotation: $[\alpha]_D^{25} = -35.5°$. Potency: 396 mcg./mg.

*Example 4.—Compressed tablets*

Fradiomycin calcium citrate:

| | |
|---|---:|
| (Fradiomycin$^{+6}$$_2$ [(citric acid$^{-3}$)$_2$Ca$^{+2}$]$_3$ (weight parts) | 298 |
| Corn starch (weight parts) | 18.476 |
| Polyvinylpyrrolidone (weight parts) | 18 |
| Yellow dye (weight parts) | 0.024 |
| Alcohol (98%) (volume parts) | 0.044 |
| Water (distillated) (volume parts) | 0.005 |
| Magnesium stearate (weight parts) | 0.5 |
| Total (mg./tablet) | 335 |

A solution of polyvinylpyrrolidone in 99% alcohol is mixed with an aqueous solution of dye. This solution is blended throroughly with a powdery mixture of fradiomycin calcium citrate and corn starch. After the blends are sifted through an oscillating granulator, moist granules are dried at 40° C. under reduced pressure (5 mg./Hg). After being screened, the dried granules are blended with magnesium stearate and compressed into tablets.

*Example 5.—Enteric coated tablets*

The compressed tablets prepared after the manner in Example 4 are coated with enteric coating substance comprising 8 weight parts of cellulose-acetate-phthalate and dibutylphthalate (2:1) in 100 volume parts of acetone.

Although the present invention has been described in conjunction with preferred embodiments, it is to be understood that modifications and variations may be resorted to without departing from the sprit and scope of the invention, as those skilled in the art will readily understand. Such modifications and variations are considered to be within the purview and scope of the invention and appended claims. In this specification and claims, percentages are all on the weight basis, and relationship between part by weight and part by volume is the same as that between gram and milliliter. The "potency" occurring in the examples was tested after the standards of pharmaceutical preparation of antibacterial substance, notification No. 49 in 1961 of the Japanese Ministry of Welfare and is expressed in terms of weight of fradiomycin free base in fradiomycin sulfate, the antimicrobial activity of which corresponds to that of 1 milligram of the fradiomycin salt tested.

What is claimed is:

1. Fradiomycin salt consisting of M mole of fradiomycin cation, N mole of citric acid anion and L mode of calcium ion, M, N and L being in the relation of the equation $$3N - 2L = kM$$

where $k$ is an integer from 1 to 6.

2. Fradiomycin salt consisting of M mole of fradiomycin cation, N mole of malic acid anion and L mole of calcium ion, M, N and L being in the relation of the equation $$2N - 2L = kM$$

where $k$ is an integer from 1 to 6.

3. Fradiomycin calcium citrate represented by the formula

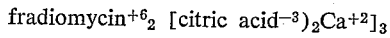

fradiomycin$^{+6}$$_2$ [citric acid$^{-3}$)$_2$Ca$^{+2}$]$_3$

4. Fradiomycin calcium malate represented by the formula

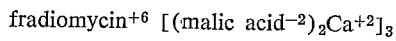

fradiomycin$^{+6}$ [(malic acid$^{-2}$)$_2$Ca$^{+2}$]$_3$

References Cited by the Examiner

UNITED STATES PATENTS 3,142,671  7/1964  Kawaguchi et al. _____ 260—210

OTHER REFERENCES

Yamazaki: "The Journal of Antibiotics," Series A, vol. XIII, No. I, 1960, pp. 6–18.

LEWIS GOTTS, *Primary Examiner.*

JOHNNIE R. BROWN, *Assistant Examiner.*